UNITED STATES PATENT OFFICE.

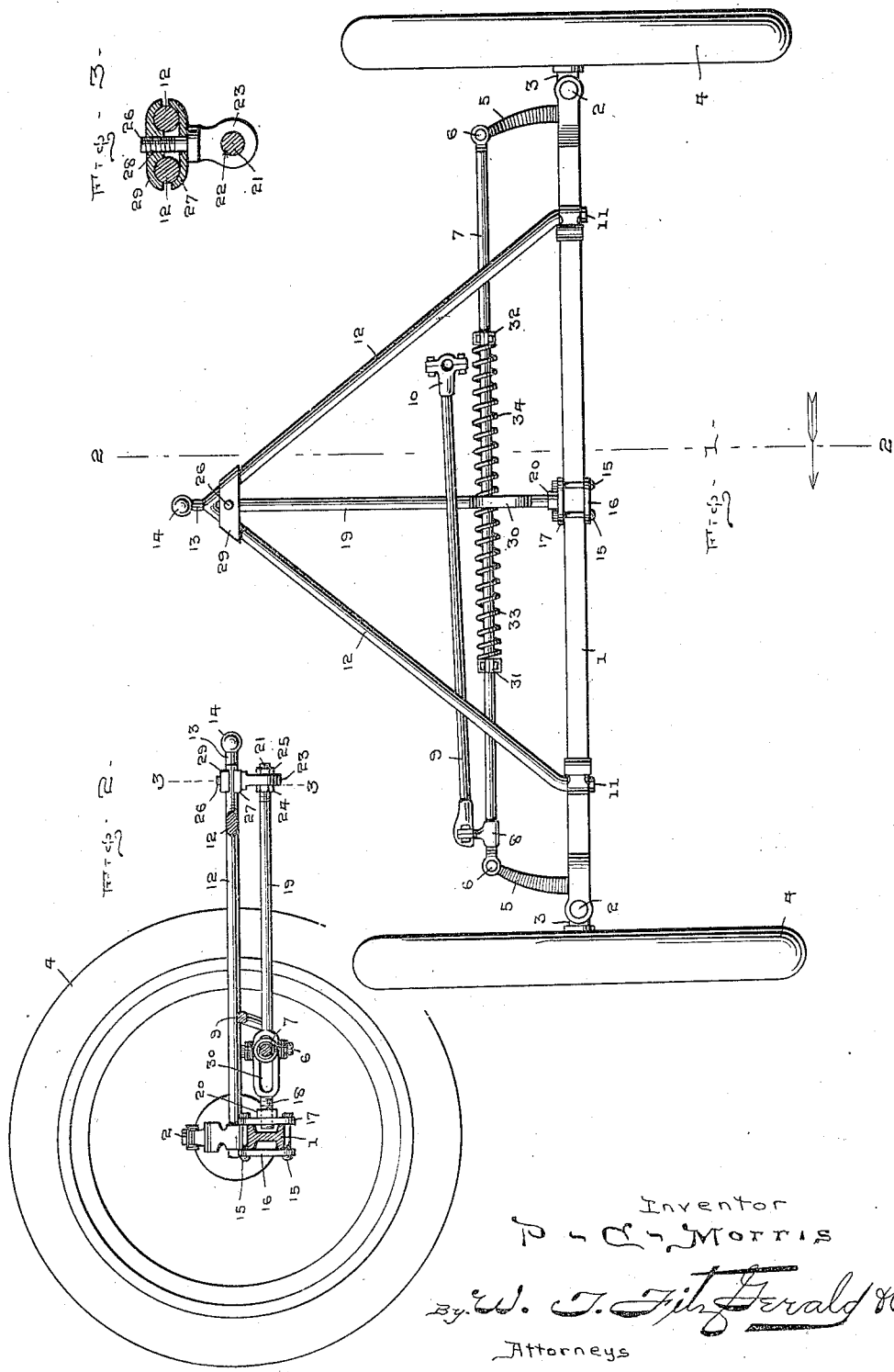

PRATT C. MORRIS, OF THOMASVILLE, GEORGIA, ASSIGNOR OF ONE-HALF TO CHARLES W. COOPER, OF THOMASVILLE, GEORGIA.

SELF-STEERING AND REINFORCING DEVICE FOR AUTOMOBILES AND THE LIKE.

1,305,923.           Specification of Letters Patent.     Patented June 3, 1919.

Application filed June 15, 1917.   Serial No. 174,925.

*To all whom it may concern:*

Be it known that I, PRATT C. MORRIS, a citizen of the United States, residing at Thomasville, in the county of Thomas and State of Georgia, have invented certain new and useful Improvements in Self-Steering and Reinforcing Devices for Automobiles and the like; and I do hereby declare the following to be a full, clear, and exact description of the invention, such as will enable others skilled in the art to which it appertains to make and use the same.

This invention relates to a new and useful self steering and reinforcing device for automobiles and the like.

One of the objects of this invention is to provide a device of this character for automatically centering the steering gear of the vehicle so that the steering wheels will be normally maintained in a straight course and thereby relieve the mind and the arms of the driver of the vehicle of the constant strain occasioned by his being kept on the alert in order to keep the vehicle in its proper course along a road way or street, as is now the case with the automobiles and the like in common use, but which device will not in any manner interfere with the proper turning of the vehicle by the driver.

Another object of this invention is to provide such a device which is provided with means for supporting the connecting rod of the steering gear at its vulnerable point and at the same time reinforce the front axle at its center and the radius rod in a manner to prevent breakage of these parts by crystallization of the metal due to vibrations.

Another object of this invention is to provide such a device that will, in addition to the above objects, efficiently prevent wear and rattling of the parts of the steering mechanisms.

Another object of this invention is to provide a device of this character consisting of few parts, efficient and durable, economical to manufacture, and which can be readily attached to automobiles and the like vehicles now in use or which can be built in the vehicles during their course of manufacture.

These and other objects and advantages will more fully appear as the nature of the invention is more clearly understood from the following description taken in connection with the accompanying drawings wherein there is disclosed one embodiment of the invention, but which is susceptible to numerous variations and alterations in the form, construction and arrangement of the parts thereof to meet the exigencies of the case without departing from the spirit of the invention or exceeding the scope of the appended claims.

In the drawings:

Figure 1 is a top view of the front axle and steering mechanisms of a motor vehicle, showing the invention in applied operative position.

Fig. 2 is a horizontal sectional view on line 2—2 of Fig. 1 and looking in the direction of the arrow.

Fig. 3 is a vertical sectional view on line 3—3 of Fig. 2.

I desire to here state that for the sake of clearness and convenience in illustrating the use and adaptation of my invention, I have shown and will describe the same in this application as applied to the front axle and steering gear of a Ford automobile, but that the invention is equally applicable to automobiles and the like of other makes.

Referring to the drawings, wherein similar reference characters denote corresponding parts throughout the several views, 1 denotes the front axle of an automobile having pivotally mounted in its ends the swivel posts 2 of the stub axles 3 upon which revolve the front steering wheels 4. The stub axles 3 are provided with the actuating arms 5 having pivotally connected to their free ends, as at 6, the connecting rod 7 and suitably secured upon the connecting rod 7 as by the bracket 8 or other suitable attaching means is the steering rod 9 having its opposite end provided with any suitable form of attaching member 10 for connecting the steering rod 9 to the usual steering post of the vehicle. Connected to the front axle 1, as at 11, are the forward ends of the rearwardly converging rods 12 which merge into the shank 13 provided with the spherical head 14 for seating in a corresponding socket in the usual crank case bracket, this latter construction comprising what is commercially termed the radius rod.

Secured to the axle 1, preferably at its center, and by the bolts 15 is the front plate 16 and the rear plate 17, the rear plate 17 being provided with a threaded apertured boss 20 through which is threaded the end 18 of the reinforcing and supporting bar 19 for firmly securing this end of the reinforcing bar 19 upon the axle 1. The end 21 of the bar 19 is also threaded and projected through the aperture 22 of the bracket 23 and rigidly secured therein by the oppositely disposed binding or lock nuts 24 and 25. The bracket 23 being provided with the threaded stem 26 which projects upwardly between the adjacent portions of the rods 12 and through the lower clamping plate 27 and is screw threaded through the threaded aperture 28 of the upper clamping plate 29, so that, when the bracket 23 is rotated for attaching the same upper rods 12 the clamping plates 27 and 29 will be drawn toward each other and efficiently clamp therebetween the portions of the rods 12 of the radius rod.

The supporting and reinforcing bar 19 is provided in proximity to its forward end 18, with the elongated supporting and guiding link or member 30 for supporting and guiding the connecting rod 7 which passes therethrough. Suitably secured upon the connecting rod 7 at desired points at either side of the guiding link or member 30 are the collars 31 and 32, or other suitable stop members, and surrounding the portions of the connecting rod 7 at either side of the guiding member 30 and between the collars 31 and 32 are the compression springs 33 and 34, which springs 33 and 34 bear against either side of the supporting and guiding link or member 30 of the bar 19 and their respective collars 31 and 32 for normally maintaining the center of the connecting rod 7 of the steering mechanism within the supporting and guiding link or member 30 for holding the steering wheels 4 in such manner that the vehicle will travel in a straight course.

The operation of the invention and the advantages attained thereby will be briefly described as follows:

When the motor vehicle is traveling along a straight course the springs 33 and 34 will exert an equal pressure against the respective sides of the link member 30 of the bar 19 and thus normally center the connecting rod 7 of the steering gear relative of the link 30 and thereby maintaining the steering wheels 4 of the vehicle in a straight course, thus relieving the operator of the vehicle of the necessity of constantly grasping and rigidly holding the steering wheel of the vehicle and of the strain of closely watching the direction that the vehicle is traveling, and should either of the steering wheels 4 drop into a depression or come in contact with an obstruction in or upon the road way or street the wheels would necessarily be deflected either to the right or left as the course may be, but immediately thereafter one or the other of the springs 33 or 34 will cause the connecting rod of the steering gear to be automatically centered within the link 30 so that the steering wheels 4 will again assume a straight course, and also in the event of the steering wheels 4 being properly deflected by the operator of the vehicle for turning either to the right or to the left and deflected to any degree the springs 33 or 34 will likewise automatically center the connecting rod with respect to the link 30, as above stated, immediately upon the operator of the vehicle releasing the steering wheel. Again, by the provision of the reinforcing bar 19 and its supporting and guiding link or member 30 the front axle of the vehicle is reinforced at its weakest point as are also the rods 12 of the radius rod, whereby the axle and the radius rod are efficiently reinforced against breakage and in a manner that should such accident occur from any unforeseen contingency the vehicle would not be rendered utterly useless but may be driven to a garage or other point where the same may be repaired. The guiding link 30 not only provides for the backward and forward traveling of the connecting rod 7 therethrough, but also efficiently reinforces the connecting rod 7 by preventing undue movement of the central portion thereof in any direction and efficiently reinforcing the rod 7 at a point where these rods are most likely to be unduly bent and ofttimes break. Furthermore this invention will efficiently prevent the crystallization of the parts of the vehicle which is due to the excessive vibrations to which these parts are subjected and at the same time also prevents rattling of the parts of the steering mechanism and thereby prevents undue wear of these parts.

Having described my invention, what I claim as new and desire to secure by Letters Patent, is:—

1. In a vehicle, the combination with an axle provided with link-connected steering knuckles and a V-shaped radius rod, of an auxiliary radius rod extending from substantially the apex of the V-shaped rod to the center of the axle, and a spring device acting upon the steering knuckle connecting link and reacting upon the auxiliary radius rod and arranged to yieldingly hold said steering knuckles in straight ahead position.

2. In a vehicle, the combination with an axle provided with link-connected steering knuckles and a V-shaped radius rod, of an auxiliary radius rod extending from substantially the apex of the V-shaped rod to the center of the axle and provided with an opening through which said connecting link passes, and spring devices mounted upon said link to act upon the steering knuckle and the auxiliary radius rod.

3. In a device of the character specified, the combination with a front axle, of joined radius rods extending rearwardly there-from, a steering gear for a motor vehicle provided with a connecting rod, a depending hanger disposed at the joined end of said rods, a reinforcing bar extending from said axle to said hanger in a plane below said radius rods and having an elongated link portion through which said connecting rod passes, and tension means upon said connecting rod contacting with opposite sides of said link portion and with abutments on said rods.

In testimony whereof I have signed my name to this specification in the presence of two subscribing witnesses.

PRATT C. MORRIS.

Witnesses:
C. F. THOMSON,
E. L. ALDERMAN.

Copies of this patent may be obtained for five cents each, by addressing the "Commissioner of Patents, Washington, D. C."